Patented Aug. 20, 1929.

1,725,619

UNITED STATES PATENT OFFICE.

MARTIN MÜLLER-CUNRADI, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

MANUFACTURE OF IRON CARBONYL.

No Drawing. Application filed October 19, 1925, Serial No. 63,558, and in Germany January 5, 1925.

In carrying out reactions in which gases are led over heated solid substances, for example catalysts, in vertical vessels it is usual to introduce the gases at the lower end and to withdraw them at the upper end of the vessel. This manner of working is employed with regard to the natural flowing direction of gases heated within the vessel and has the advantage of avoiding troublesome gas vortices. It has been found to be of particular advantage when working with gases under high pressures.

I have now found that in contradistinction to this general rule, the production of iron carbonyl by the reaction of carbon monoxid with coarse grained iron under pressure is much more advantageously carried out with the carbon monoxid passed through the iron in the high pressure vessel in a downward direction. In this case, the quantities of iron carbonyl obtained in a given time are higher (often by a multiple) than when leading the carbon monoxid in the opposite direction.

I claim:

The process of producing iron carbonyl by the action of carbon monoxid on coarse grained iron under pressure characterized by the carbon monoxid being passed through a vertical reaction vessel containing the iron, in a downward direction.

In testimony whereof I have hereunto set my hand.

MARTIN MÜLLER-CUNRADI.